Sept. 15, 1959 J. L. BRADY 2,904,202

CLAMP MECHANISM

Filed March 10, 1954 4 Sheets-Sheet 1

INVENTOR.
JOSEPH L. BRADY
BY J. Frederick Bechtel
ATTY.

Sept. 15, 1959 J. L. BRADY 2,904,202

CLAMP MECHANISM

Filed March 10, 1954 4 Sheets-Sheet 2

INVENTOR.
JOSEPH L. BRADY
BY J. Frederick Bechtold
ATTY.

Sept. 15, 1959 J. L. BRADY 2,904,202

CLAMP MECHANISM

Filed March 10, 1954 4 Sheets-Sheet 3

INVENTOR.
JOSEPH L. BRADY
BY J. Frederick Bechtold
ATTY.

Sept. 15, 1959 J. L. BRADY 2,904,202

CLAMP MECHANISM

Filed March 10, 1954 4 Sheets-Sheet 4

INVENTOR.
JOSEPH L. BRADY
BY J. Frederick Bechtold
ATTY.

United States Patent Office 2,904,202
Patented Sept. 15, 1959

2,904,202

CLAMP MECHANISM

Joseph L. Brady, Marshall, Mich., assignor to Clark Equipment Company, a corporation of Michigan Application March 10, 1954, Serial No. 415,406

9 Claims. (Cl. 214—653)

My present invention relates generally to industrial trucks, and, more specifically, is directed to a clamp mechanism for an industrial truck.

It is an object of my present invention to provide a clamp mechanism for an industrial truck which will, as it engages a load, tend to draw the load toward the truck in a "hugging" fashion.

It is a further object of my present invention to provide a clamp mechanism for an industrial truck as aforesaid whtich is further actuatable rapidly for engaging and releasing a load.

In accomplishing the aforesaid objects I provide a clamp attachment which comprises a pair of clamp arm assemblies pivotally secured at their one ends to frame means adapted to be mounted on the load supporting carriage of an industrial truck. The other, or forward, ends of the clamp arm assemblies are adapted to grip the load that is to be engaged. The force for pivoting the arm assemblies toward and away from a load is applied to the arm assemblies intermediate of the ends thereof. By virtue of the above described arrangement of the elements of my clamp mechanism, as a load is being engaged, the forward gripping ends of the arm assemblies are moved arcuately inwardly toward the truck for "hugging" the load. Moreover, since each clamp arm assembly is pivoted about one extreme end, rather than at some intermediate point, the forward gripping end of each arm assembly may be moved rapidly toward and away from a load.

Now, in order to acquaint those skilled in the art with the manner of constructing and using clamp mechanisms in accordance with the principles of my present invention, I shall describe in connection with the accompanying drawings a preferred embodiment of my invention.

Figure 1:
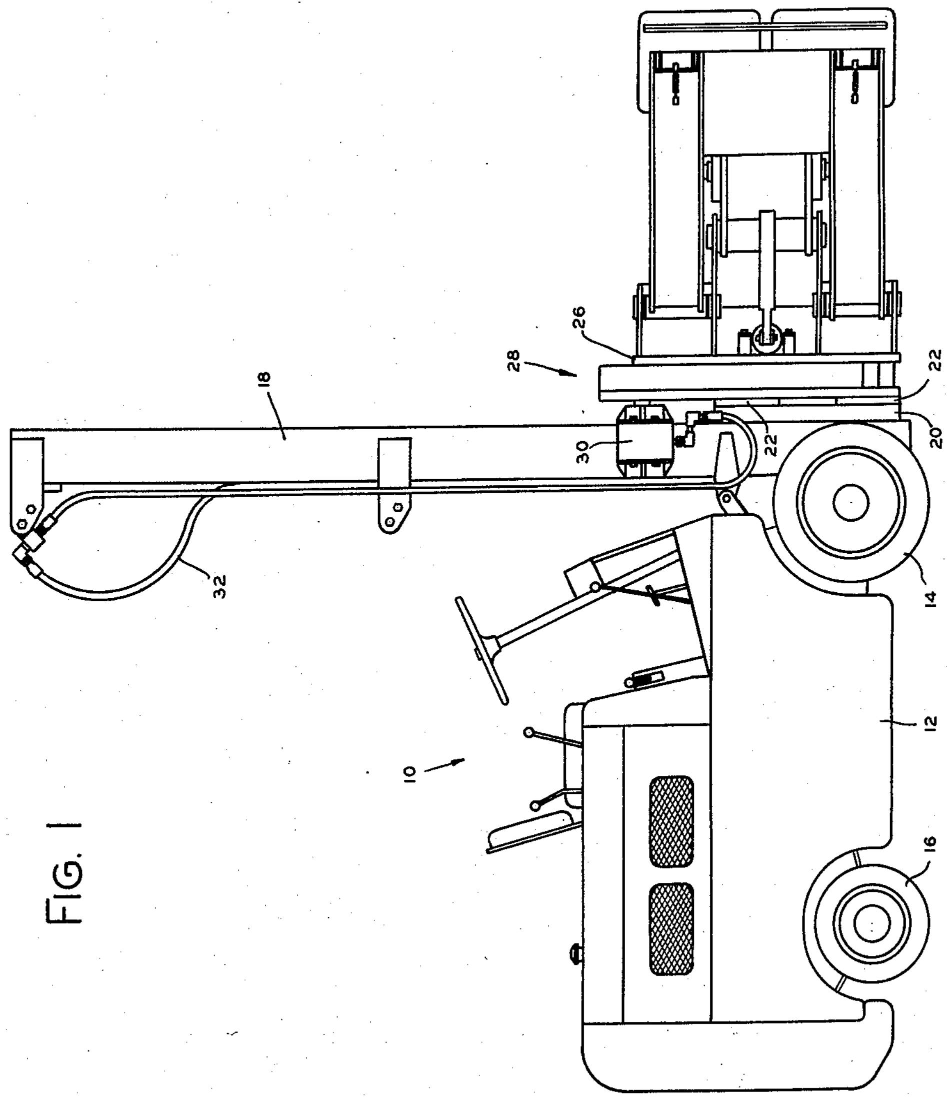
Figure 1 is a side elevational view of an industrial truck to which, at the forward end thereof, is secured the clamp mechanism of my present invention.

Referring now to the drawings, there is indicated generally by the reference numeral 10 an industrial truck having a main frame 12 supported on forward wheels 14 and rear wheels 16. A vertically extending mast 18 is mounted on the forward end of the main frame 12, and arranged for upward and downward movement therein is a load supporting carriage 20.

Figure 2:
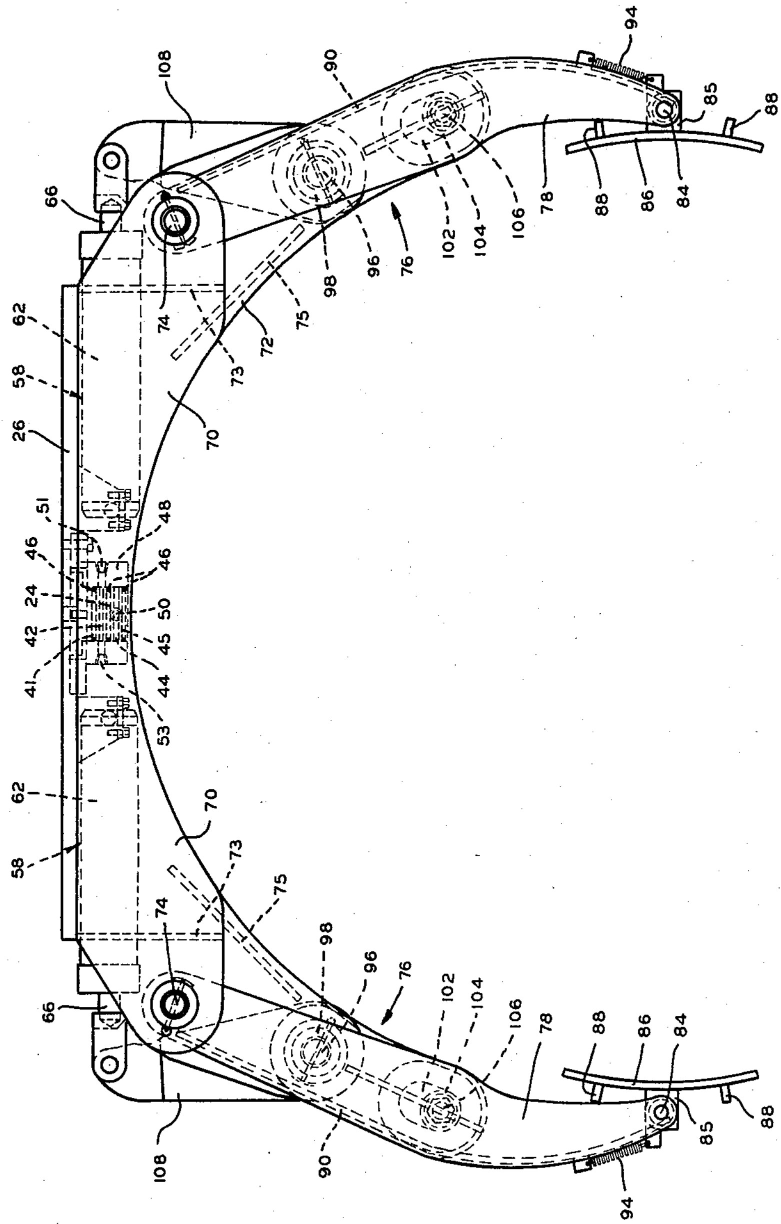
Figure 2 is a plan view of the clamp mechanism of Figure 1.

Secured, in a conventional manner, to the forward face of the load supporting carriage 20 is a pair of vertical transversely extending frame members 22. A plate member 26 is spaced from the frame member 22, and disposed between and connected with these members is suitable power driven means indicated generally at 28 which is provided for rotating the plate member 26 relative to the frame members 22 about an axis extending longitudinally of the truck. Since the power rotating means 28 does not form a part of my present invention, it is believed that a detailed showing and description thereof is unnecessary for purposes of the present disclosure. It may be stated, however, that in the typical construction illustrated an hydraulic motor 30 operates a stub shaft 24 (see Figs. 2 and 3) through a chain and sprocket mechanism included in 28. In the typical device illustrated, 180° of rotation is provided so that the load may be inverted if desired.

The portion of the stub shaft 24 which projects forwardly of the vertical transverse plate member 26 is formed with a plurality of axially spaced annular grooves 41, 42, 43, 44 and 45. Disposed in the grooves 41, 43, and 45 are fluid seals 46. The grooves 42 and 44 are connected with fluid passageways (not shown) which are formed in the stub shaft 24. The fluid passageways are adapted to be placed in communication with a source of fluid under pressure by means of suitable hose lines 32 and a conventional manually operable valve conveniently located on the truck.

Figure 3:
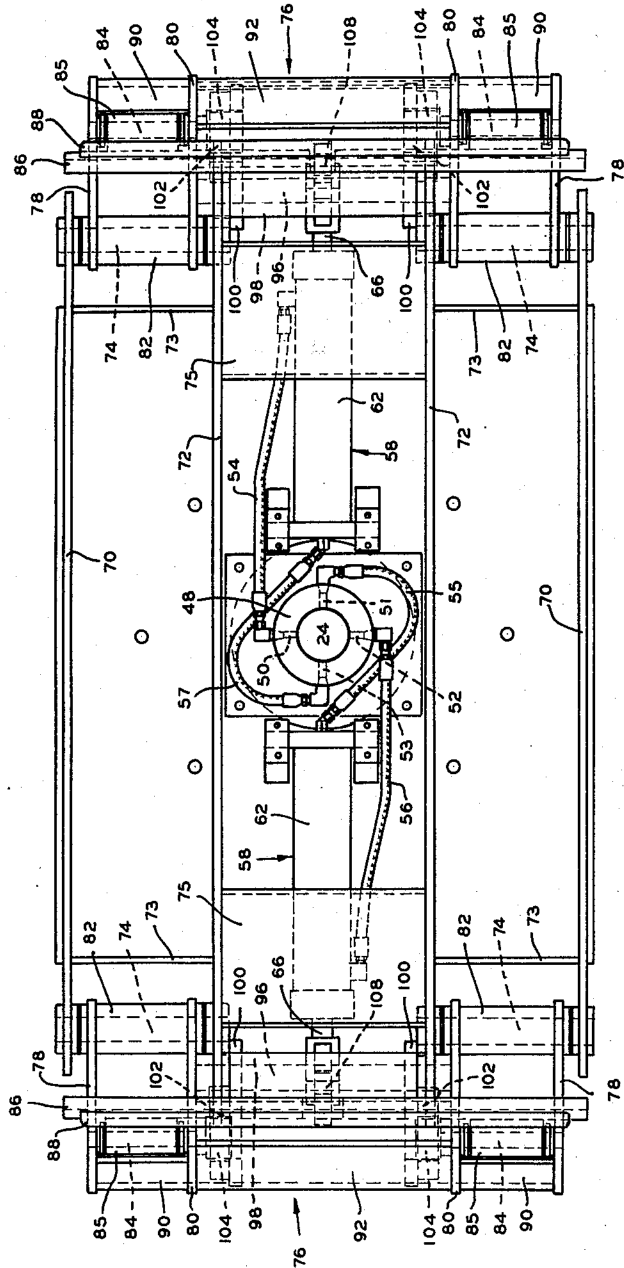
Figure 3 is a front elevational view of the clamp mechanism of Figure 1.
Figure 4:
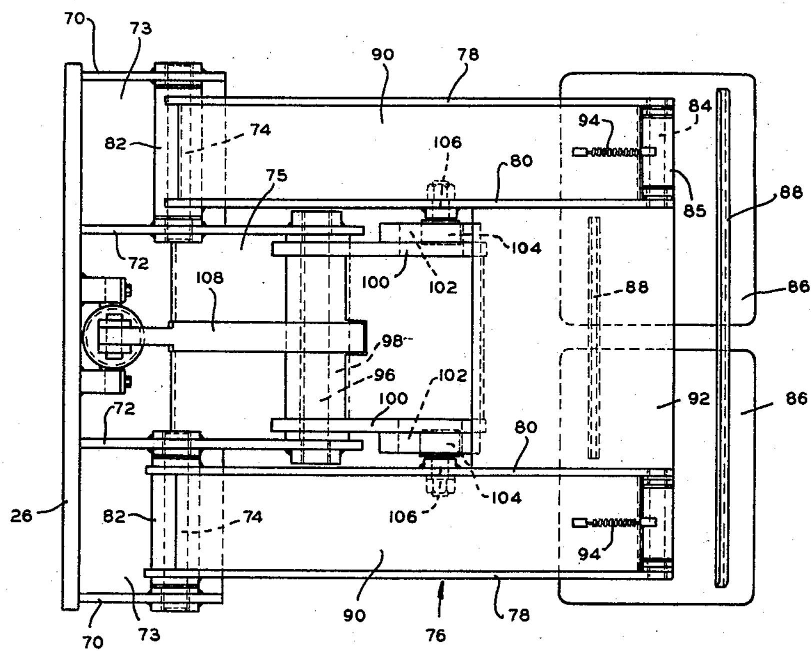
Figure 4 is a side elevational view of the clamp mechanism of Figure 1.

Secured to the plate member 26 and rotatably mounted on the stub shaft 24 is a fluid distributor hub member 48. In the specific embodiment of my invention being described, four circumferentially spaced radial openings 50, 51, 52 and 53 are formed in the fluid distributor member 48. The openings 50 and 52 communicate with the annular groove 44 and the openings 51 and 53 communicate with the annular groove 42, irrespective of the rotative position of the hub member 48 relative to the stub shaft 24. In addition, the openings 50, 51, 52 and 53, respectively, have connected thereto fluid hose lines 54, 55, 56, and 57. The latter hose lines are provided for directing fluid under pressure to a pair of horizontal (as shown in Fig. 3) laterally extending hydraulic piston and cylinder assemblies 58, which are used to actuate the clamp arm assemblies of the clamp of my present invention in a manner to be described in detail hereinafter. The hydraulic assemblies comprise cylinders 62 and piston rods 66.

Secured to the plate member 26, at the upper and lower edges thereof, are horizontal clamp arm supporting members 70. Also secured to the plate member 26, inwardly of the members 70, are horizontal clamp arm supporting members 72. The members 70 and 72, at their ends, are formed with forwardly projecting legs—the legs of the members 72 projecting forwardly farther than the legs of the members 70. The members 70 and 72 are reinforced by web plates 73 and the members 72 are reinforced by web plates 75.

Shafts 74 are journalled at their one ends in the outer ends of the legs of the supporting members 70 and at their other ends in the intermediate portions of the legs of the supporting members 72. Clamp arm assemblies indicated generally at 76 are mounted, one at each side of the plate member 26, for pivotal movement about the axes of the shafts 74.

Each clamp arm assembly 76 comprises upper and lower pairs of arm elements 78 and 80 which are secured at their one ends to sleeve members 82 fixed about the shafts 74. The other ends of the pairs of arm elements 78 and 80 carry pin members 84 which support hinge sleeves 85 secured to vertically extending curved clamp jaws 86 interconnected by reinforcing members 88. The respective pairs of arm elements 78 and 80 are interconnected along their outer edges by web plates 90, and the arm elements 80 are interconnected at their forward ends by a web plate 92. A spring 94 is arranged between each of the hinge sleeves 85 and the adjacent web plate 90 for normally spreading the forward edges of the pairs of clamp jaws 86 to thereby accommodate loads to be engaged.

Mechanism is associated with each clamp arm assembly 76 for effecting pivotal movement thereof about the axes of the shafts 74 so that the clamp jaws 86 may be moved toward and away from each other for gripping and releasing a load. Such mechanism comprises a vertical shaft 96, which is secured in the outer ends of the legs of the supporting members 72. The shaft 96 lies forwardly of the shafts 74. A sleeve member 98 is journalled about the shaft 96 and at its ends has secured thereto arm elements 100 which project forwardly and are fabricated to define lost motion channels 102. Disposed in the lost motion channels 102 are rollers 104 which are carried by pin members 106 secured in the adjacent arm elements 80. The lost motion connections defined by the channels 102 and rollers 104 lie forwardly of the shaft 96. A lever 108 is secured at one end to the intermediate portion of the sleeve member 98 and at the other end to the outer end of the piston rod 66 of the adjacent hydraulic assembly 58. The latter connection lies rearwardly of the shafts 74. The lever 108 and arm elements 100 define lever means or bell crank means which, together with the associated hydraulic assembly 58, serves as power actuated means for effecting pivotal movement of the clamp arm assemblies 76.

When fluid under pressure is admitted to the cylinders 62 of the hydraulic assemblies 58 for distending the piston rods 66, the levers 108 are pivoted about the shafts 96. This action causes pivotal movement of the arm elements 100 and the clamp arm assemblies 76. It is to be noted that relative movement between the arm elements 100 and clamp arm assemblies 76 is required because they pivot about different axes. Such relative movement is provided for by the aforedescribed lost motion connections comprising the lost motion channels 102 and rollers 104.

With the clamp mechanism of my present invention disposed in the position shown in the accompanying drawings, an upright cylindrical load may be engaged. When the truck 10 is being maneuvered to engage a load, fluid under pressure is admitted to the cylinders 62 through the stub shaft 24, fluid distributor hub member 48, and the hose lines 54 and 56 thereby causing the piston rods 66 to be retracted, which, through the levers 108 and arm elements 100, effects spreading of the clamp pads 86. The truck 10 is then driven forwardly until the clamp pads 86 are arranged at the sides of the load to be engaged. Then fluid is bled from the fluid lines 54 and 56 while fluid under pressure is simultaneously directed to the cylinders 62 through the fluid lines 55 and 57. Such direction of fluid under pressure causes the piston rods 66 to be extended for pivoting the clamp pads 86 toward the load to be engaged.

It is to be noted that the force for pivoting the arm assemblies 76 toward and away from a load is applied to the arm assemblies intermediate of the ends thereof. By virtue of this arrangement, as a load is being clamped, the forward gripping ends of the arm assemblies are moved arcuately inwardly toward the truck for "hugging" the load. Attention is also directed to the fact that, since each clamp arm assembly 76 is pivoted about one extreme end, rather than at an intermediate point, the forward gripping end of each arm assembly may be moved rapidly toward and away from a load.

After the load has been clamped between the clamp pads 86, the load supporting carriage 20 may be elevated in the mast 18 until the load is raised from the ground. The truck, together with the load, may then be driven to the desired location.

With the load engaging mechanism remaining in the position shown in the drawings, the load, which is held by the clamp pads 86, may be deposited in an upright position by lowering the load supporting carriage 20 until the load contacts the ground. Release of the load may be effected by bleeding fluid from the fluid lines 55 and 57 while simultaneously directing fluid under pressure to the fluid lines 54 and 56. The fluid under pressure flowing through the fluid lines 54 and 56 causes the piston rods 66 to be retracted for causing the clamp pads 86 to swing away from contact with the load. Finally, the truck 10 may be backed away and used to engage another load.

The clamp mechanism of my present invention is also adapted to engage and/or deposit loads in a horizontal position. As has been hereinbefore noted, the plate member 26, which carries the clamp arm assemblies 76, may be rotated about the axis of the stub shaft 24, through actuation of the power rotating means 28, and thus the clamp arm assemblies may be disposed either vertically or horizontally. By arranging the clamp mechanism to be rotatable about an axis extending lengthwise of the truck, tiering of loads is greatly facilitated.

Now, while I have shown and described what I believe to be a preferred embodiment of my present invention, it will be understood by those skilled in the art that various modifications and rearrangements may be made therein without departing from the spirit and scope of my present invention.

I claim:

1. A clamp mechanism comprising a clamp support plate, two pairs of outwardly projecting first supporting members secured to said plate in a manner such that the pairs are adjacent respectively the sides of the plate and the individual members of each pair are adjacent respectively the top and bottom of the plate, two pairs of forwardly projecting second supporting members secured to said plate in a manner such that the pairs are adjacent respectively the sides of the plate and between the adjacent pairs of first supporting members, a pair of forwardly extending clamp arm assemblies pivotally mounted at their rear ends on the said first and second supporting members, each clamp arm assembly having an upper and lower pivot and each said pivot being between one of the said first supporting members and one of the said second supporting members, a pair of bell crank means pivotally mounted intermediate of their ends respectively on the said pairs of second supporting members about axes lying forwardly of the said pivotal mountings of the said clamp arm assemblies, said bell crank means at their one ends having lost motion connections respectively with said clamp arm assemblies intermediate of the ends thereof with the lost motion connections lying forwardly of the pivotal axes of said bell crank means, said bell crank means being operable upon pivotal movement to effect pivotal movement of said clamp arm assemblies so that the forward ends of the assembly are moved toward and away from each other, a pair of double acting piston and cylinder hydraulic motors secured to said plate and having connection respectively with the other ends of said bell crank means rearwardly of the said pivotal mountings of the said clamp arm assemblies, and said hydraulic motor means upon actuation serving to effect pivotal movement of said bell crank means whereby to effect pivotal movement of said clamp arm assemblies through the said lost motion connections.

2. In an industrial truck having a vertically extending mast mounted thereon adjacent one end thereof, vertical load supporting carriage means extending transversely of the truck and connected to said mast and actuatable longitudinally thereof, an upright plate member operatively connected to the carriage means for movement therewith, a pair of clamp arm assemblies extending forwardly of the truck and pivotally mounted at their rear ends to said plate member at opposite sides thereof, bell crank means pivotally mounted intermediate of their ends to said plate member about axes lying forwardly of and parallel to the pivotal mounting of the clamp arm assemblies to said plate member, said bell crank means at their one ends having lost motion connection with said clamp arm assemblies intermediate of the longitudinally disposed ends thereof with the lost motion connections lying forwardly of and parallel to the pivotal axes of said bell crank means, said bell crank means being operable upon pivotal movement to effect pivotal movement of said clamp arm assemblies so that the forward ends of the latter may be moved toward and away from each other, and motor means secured to said plate member and having connection with the other ends of the said bell crank means, said motor means upon actuation serving to effect pivotal movement of said bell crank means.

3. In an industrial truck having a vertically extending mast mounted thereon adjacent one end thereof, vertical load supporting carriage means extending transversely of the truck and connected to said mast and actuatable longitudinally thereof, an upright member connected to said carriage means and extending transversely of the truck, first pivot means connected to said upright member adjacent opposite sides thereof, a pair of opposed clamp arm assemblies mounted adjacent their rear ends to said pivot means and extending forwardly of the truck, second pivot means located forwardly of said first pivot means and connected to said upright member adjacent opposite sides thereof, a pair of bell crank means mounted for opposed pivotal movement about said second pivot means and having loose connection with said clamp arm assemblies intermediate of the longitudinally disposed ends thereof, and power actuated means connected to said bell crank means rearwardly of said second pivot means to effect opposed pivotal movement of said clamp arm assemblies about said first pivot means.

4. In an industrial truck having a vertically extending mast mounted thereon adjacent one end thereof, a vertical load supporting carriage means extending transversely of the truck and connected to said mast and actuatable longitudinally thereof, upright plate means extending transversely of the truck and connected to said carriage means, first pivot means operatively connected to said plate means adjacent opposite sides thereof, a pair of opposed clamp arm assemblies mounted adjacent their rear ends to said pivot means and extending forwardly of the truck, second pivot means parallel to said first pivot means and connected to said plate means adjacent opposite sides thereof, a pair of bell crank means mounted for opposed pivotal movement about said second pivot means and extending forwardly and rearwardly of said second pivot means, said bell crank means being loosely connected at their forward end portions with said clamp arm assemblies and intermediate of the longitudinally disposed ends of said arm assemblies, and motor means having connection with the rearward end portions of said bell crank means for effecting actuation of the latter about said second pivot means, whereby upon actuation of said bell crank means opposed pivotal movement of said clamp arm assemblies is effected about said first pivot means.

5. The clamp mechanism of claim 4 wherein the connections between said bell crank means and said clamp arm assemblies are lost motion connections.

6. A mechanism as claimed in claim 2 wherein the connection between said motor means and the rearward ends of said bell crank means is disposed rearwardly of the pivotal mountings of the clamp arm assemblies to said plate member.

7. A clamp mechanism comprising support means, first pivot means connected to said support means adjacent opposite sides thereof, a pair of opposed clamp arm assemblies mounted adjacent their rear ends to said pivot means and extending forwardly of said support means, second pivot means parallel to and spaced forwardly of said first pivot means and also connected to said support means adjacent opposite sides thereof, a pair of bell crank means mounted for opposed pivotal movement about said second pivot means and having loose connection with said clamp arm assemblies intermediate of the longitudinally disposed ends thereof, and power actuated means connected to said support means and having connection with said bell crank means rearwardly of said second pivot means to effect relatively rapid clamping movement of said clamp arm assemblies about said first pivot means.

8. A clamp mechanism as claimed in claim 7 wherein said loose connection comprises lost motion means, said lost motion means lying forwardly of and parallel to the said second pivot means.

9. A clamp mechanism comprising support means, first pivot means connected to said support means adjacent at least one side thereof, a first clamp arm mounted upon said pivot means and extending forwardly of said support means, second pivot means spaced forwardly of said first pivot means and also connected to said support means adjacent at least said one side thereof, bell crank means mounted for pivotal movement about said second pivot means and extending forwardly and rearwardly thereof, said bell crank means being loosely connected to said clamp arm forwardly of said second pivot means, motor means connected to the rearward extension of said bell crank means for actuating the bell crank means about the second pivot means and the clamp arm about the first pivot means, and a second clamp arm connected to said support means and extending forwardly thereof and adapted to cooperate with said first clamp arm in holding material therebetween.

References Cited in the file of this patent

UNITED STATES PATENTS

| | | |
|---|---|---|
| 247,829 | Johnson | Oct. 4, 1881 |
| 1,009,760 | Loreman | Nov. 28, 1911 |
| 2,497,600 | Grigsby | Feb. 14, 1950 |
| 2,652,280 | Billings | Sept. 15, 1953 |
| 2,666,541 | Ferrerio et al. | Jan. 19, 1954 |
| 2,669,479 | Louckes | Feb. 16, 1954 |
| 2,683,546 | Sherriff | July 13, 1954 |